United States Patent
Pettersen et al.

(10) Patent No.: US 12,454,994 B2
(45) Date of Patent: Oct. 28, 2025

(54) SCREW AND NUT LINEAR DRIVE ASSEMBLY

(71) Applicant: Kongsberg Automotive Holding 2 AS, Kongsberg (NO)

(72) Inventors: Ketil Pettersen, Kongsberg (NO); Kjell Ivar Karlsen, Porsgrunn (NO); Christer Oldeide, Drammen (NO); Henrik Haugum, Kongsberg (NO); Stein-Erik Arne, Lørenskog (NO); Jacob Jung, Fornebu (NO); Bjørn Iverson, Kongsberg (NO); Bård Vestgard, Lier (NO)

(73) Assignee: Kongsberg Automotive Holding 2 AS, Kongsberg (NO)

( * ) Notice: Subject to any disclaimer, the term of this patent is extended or adjusted under 35 U.S.C. 154(b) by 0 days.

(21) Appl. No.: 18/713,403

(22) PCT Filed: Dec. 23, 2021

(86) PCT No.: PCT/EP2021/087595
§ 371 (c)(1),
(2) Date: May 24, 2024

(87) PCT Pub. No.: WO2023/117120
PCT Pub. Date: Jun. 29, 2023

(65) Prior Publication Data
US 2024/0337311 A1    Oct. 10, 2024

(51) Int. Cl.
*F16H 25/20*    (2006.01)
*F16H 25/22*    (2006.01)
(Continued)

(52) U.S. Cl.
CPC ..... *F16H 25/2006* (2013.01); *F16H 25/2003* (2013.01); *F16H 25/2209* (2013.01);
(Continued)

(58) Field of Classification Search
CPC .. F16H 25/20; F16H 25/2003; F16H 25/2204; F16H 25/2209; F16H 2024/2445;
(Continued)

(56) References Cited

U.S. PATENT DOCUMENTS 3,934,483 A * 1/1976 Luthi ................. F16H 25/24
                                                          74/89.36
3,977,269 A * 8/1976 Linley, Jr. ......... F16H 25/24
                                                          74/441
(Continued)

FOREIGN PATENT DOCUMENTS

DE    102009036824 A1    2/2011
DE    102015102655 A1 *  8/2016
(Continued)

OTHER PUBLICATIONS

English translation of FR 2079688 A5 (Year: 1971).*
(Continued)

Primary Examiner — Joseph Brown
(74) Attorney, Agent, or Firm — Howard & Howard Attorneys PLLC

(57) ABSTRACT

A screw and nut linear drive assembly includes a housing, a screw within the housing, an electric motor for rotating the screw, a nut which is driven, when the screw is rotated, to move linearly in a longitudinal direction coinciding with the screw axis, and an axial force transfer arrangement to transfer force from the nut to a push rod to be connected to a member to be actuated by the assembly. The transfer arrangement includes a sequential arrangement of a first and a second axial force transferring component in force transmitting contact that are configured such that first contact points between the first and second axial force transferring components define a first axis (in a plane perpendicular to the longitudinal direction, about which the second axial force transferring component is capable of tilting with (Continued)

respect to the first axial force transferring component to reduce torque transfer to the nut).

18 Claims, 8 Drawing Sheets

(51) Int. Cl.
    *F16D 23/12*     (2006.01)
    *F16D 125/40*    (2012.01)
    *F16H 25/24*     (2006.01)

(52) U.S. Cl.
    CPC .... *F16D 2023/123* (2013.01); *F16D 2125/40* (2013.01); *F16H 2025/204* (2013.01); *F16H 2025/2445* (2013.01)

(58) Field of Classification Search
    CPC ............... F16H 37/126; F16H 25/2006; F16H 2025/204; F16D 2023/123; F16D 2125/40
    See application file for complete search history.

(56) References Cited

U.S. PATENT DOCUMENTS

| | | | |
|---|---|---|---|
| 4,434,677 A * | 3/1984 | Linley, Jr. ................ | B23Q 5/40 74/89.42 |
| 5,392,662 A * | 2/1995 | Jadrich ................... | F16H 25/24 403/220 |
| 8,800,341 B2 | 8/2014 | Osterlanger et al. | |
| 2005/0167211 A1 * | 8/2005 | Hageman ................ | F16D 65/18 188/71.9 |
| 2014/0147061 A1 * | 5/2014 | Linnenkohl ........... | E05F 15/652 384/26 |
| 2019/0040919 A1 * | 2/2019 | Brudeli ................. | F16D 48/064 |
| 2019/0316661 A1 * | 10/2019 | Parker ..................... | F16H 25/24 |

FOREIGN PATENT DOCUMENTS

| | | |
|---|---|---|
| FR | 2079668 A5 * | 11/1971 |
| WO | 2015081951 A1 | 6/2015 |
| WO | 2017129595 A1 | 8/2017 |
| WO | 2019238224 A1 | 12/2019 |

OTHER PUBLICATIONS

Human translation of FR 2079668 A5 (Year: 1971).*
English translation of DE-102015102655-A1 (Year: 2016).*
International Search Report and Written Opinion for Application No. PCT/EP2021/087595 dated Jul. 18, 2022 and mailed Jul. 26, 2022, 14 pages.
English language abstract for DE 102009036824 A1 extracted from espacenet.com database on May 13, 2024, 1 page.

* cited by examiner

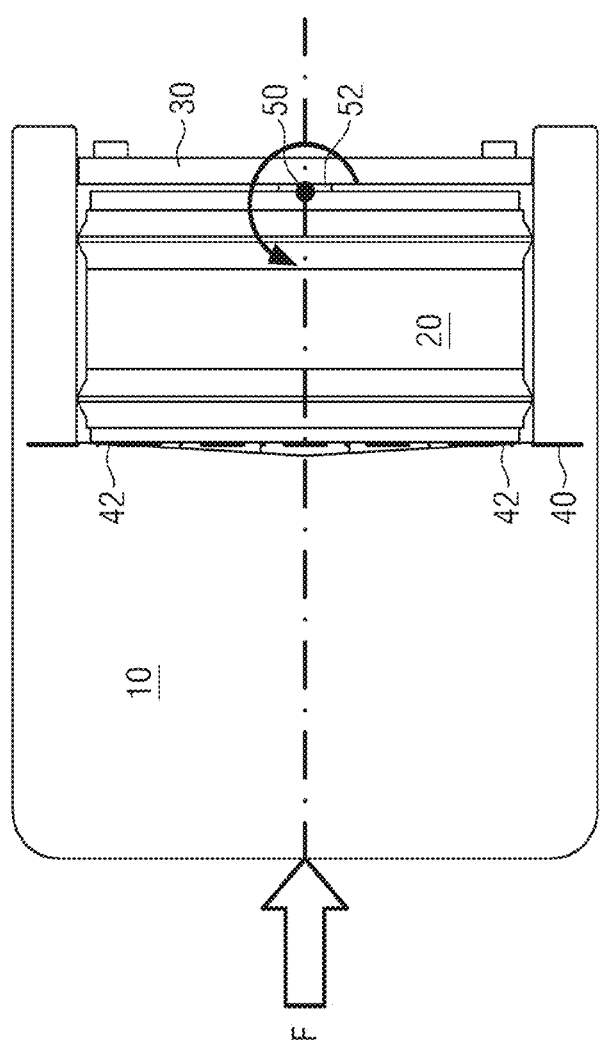

SCREW AND NUT LINEAR DRIVE ASSEMBLY

CROSS-REFERENCE TO RELATED APPLICATIONS

This application is the National Stage of International Patent Application No. PCT/EP2021/087595, filed on Dec. 23, 2021, the contents of which are incorporated herein by reference in their entirety.

BACKGROUND OF THE INVENTION

Field of the Invention

The present invention is directed to a screw and nut linear drive assembly comprising a housing, a screw within the housing, an electric motor for rotating the screw, a nut which is driven, when the screw is rotated, to move linearly in a longitudinal direction coinciding with the screw axis, an axial force transfer arrangement to transfer force from the nut to a push rod to be connected to a member to be actuated by the screw and nut linear drive assembly.

Description of Related Art

WO 2019/238224 A1 discloses a screw and nut linear drive assembly. The linear drive assembly disclosed therein is an electric clutch actuator. This electric clutch actuator comprises a screw within a housing, an electric motor for rotating the screw, a nut which is driven, when the screw is the electric motor, in to move linearly a rotated by longitudinal direction coinciding with the screw axis, and an axial force transfer arrangement to transfer movement of the nut to a push rod configured to transfer force to a member to be actuated by the screw and nut linear drive assembly. The push rod is extending in a direction parallel to the screw axis, but is transversely offset with respect to the screw axis. The push rod acts on an end portion of a clutch lever such that when the push rod is shifted in longitudinal direction the clutch lever is driven to pivot to disengage the clutch when the linear screw and nut arrangement is activated and exerting a force on the push rod. A spring rests with one of its ends on the nut and is, with its opposite end, in abutment against a pressure piece which is guided in the housing of the drive assembly for linear movement along the longitudinal direction defined by the screw axis. The spring keeps a preload on the clutch when the screw and nut drive assembly is inactive, i.e. the clutch is engaged. The pressure piece is coupled with the push rod the axial force transfer arrangement such that, when the nut is driven and moved in longitudinal direction a force is transmitted via the axial force transfer arrangement of intermediate components in contact with each other to the pressure piece and further to the push rod so that the push rod in turn is moved in longitudinal direction to thereby pivot the clutch lever.

The pressure piece is guided for linear movement along the longitudinal screw axis. Since the push rod is laterally offset with respect to the longitudinal screw axis a torque is acting on the pressure piece if force is transmitted from the pressure piece to the push rod. Such torque can be further transmitted through the axial force transfer arrangement to the nut. Such torque on the nut of a screw and nut drive arrangement results in increased friction when the nut is driven to move along the screw which eventually leads to increased tear and wear of the screw and nut linear drive assembly.

BRIEF SUMMARY OF THE INVENTION

It is an object of the present invention to arrange a screw and nut linear drive assembly such that any torque created by the force transmission of the screw and nut linear drive assembly on the member to be actuated is prevented from being transferred to the nut, or is at least substantially reduced when it is acting on the nut.

This object is achieved by the screw and nut linear drive assembly according to the present invention.

According to the present invention the axial force transfer arrangement which is configured to transfer force from the nut to a push rod comprises a sequential arrangement of axial force transferring components, which arrangement of axial force transferring components comprises, in the direction from push rod to the nut, a first and a second axial force transferring component in force transmitting contact which each other. The first and second axial force transferring components are configured such that first contact points between them define a first axis in a transverse plane perpendicular to the longitudinal direction, about which first axis the first axial force transferring component is capable of tilting with respect to the second axial force transferring component in order to reduce transfer of any torque to the nut. The first axis is defined by a line connecting the first contact points. The contact points are not points in a mathematical sense, but can also have a certain extension. For example, the first contact points can also form a continuous line which defines the first axis; such a contact line can for example be formed if one of the components has a planar contact surface and the other one has a facing contact surface comprising a linear ridge which contacts the planar contact surface of the first component so that the components are capable of tilting about the axis defined by the ridge. Alternatively, there may be only two spaced apart first contact points, wherein the first axis is defined by the line connecting the two first contact points.

The first axis is, in order to be able to reduce transfer of any torque to the nut, oriented such that is not parallel to a line connecting the screw axis with the contact point of the axial force transfer arrangement with a component to be actuated by the axial force transfer arrangement. Preferably the first axis is oriented perpendicular to this line connecting the central axis of the screw with the point where force is transferred the from axial force transfer arrangements to the push rod which in turn drives the member to be actuated by the linear drive assembly. The latter arrangement achieves the most efficient torque absorption in the axial force transfer arrangement, and thus most efficiently prevents that torque is transmitted to the nut.

In a preferred embodiment the sequential arrangement of axial force transferring components comprises a third axial force transferring component which is disposed between the nut and the second force transmitting component and which is in force transmitting contact with the second force transmitting component. The second and third axial force transferring components are configured such that second contact points between them define a second axis in a transverse plane (perpendicular to the longitudinal axis) about which second axis the second axial force transferring component is capable of tilting with respect to the third axial force transferring component to reduce transfer of any torque to the nut, wherein the second axis is oriented perpendicular to the first axis. The capability of in the axial force transfer tilting axis has the main function to arrangement about the first absorb torque exerted on the first force transferring component when force is transmitted to the push rod and further to a member to be actuated, wherein such torque may be absorbed by permitting a certain tilting movement of the first force transferring component with respect to the second force transmitting component which, therefore, is not subject to the torque acting on the first force transferring component. In other words, by allowing this tilting movement of the first force transferring component, the second force transmitting component does not take part in the tilting movement and therefore no torque is transmitted. The capability of tilting about the second axis in the axial force transfer arrangement permits to absorb tolerances, and such tilting is normally of smaller magnitudes than the capability of the first force transferring component about the first axis to absorb any torque. For example, if there is an angular misalignment or a small longitudinal offset between two s of the load transferring components this would result in side loads on the nut and screw if there would be no compensation capability by tilting about the second axis, i.e. by allowing the second force transfer component to tilt about the second axis with respect to the third force transferring component which is fully supported on the nut and therefore does not take part in this tilting movement. Thus, in this embodiment the axial force transfer arrangement permits tilting movements about two perpendicular axes within the axial force transfer arrangement which essentially decouples the nut from any force or torque transfer which is not a purely axial force transfer in the axial (longitudinal) direction of the screw.

In a preferred embodiment the first axial force transferring component is a preload plunger guided for linear movement in the housing along the longitudinal direction, said preload plunger having a recess disposed in a front face thereof and configured to receive and to be connected to an end portion of the push rod, wherein the preload plunger comprises a central bore extending along the longitudinal direction and forming an opening in a back face opposite to the front face and having, opposite to the opening, an abutment surface formed by a circumferential shoulder in the central bore. The second axial force transferring component is a bushing tube which is at least partially received in the central bore. The bushing tube and the abutment surface of the central bore being configured to come into abutment with each other in first contact points only which define the first axis, wherein an outer wall portion of the bushing tube which is received in the central bore is provided with resilient surface features which permit tilting movements of the bushing tube with respect to the central bore of the preload plunger about the first axis defined by the first contact points. The resilient surface features of the bushing tube are in contact with the inner wall of the central bore. In case of an external torque acting on the preload plunger, the preload plunger may absorb such torque by tilting, wherein this tilting on the preload plunger is not transferred to the bushing tube which remains stationary within the central bore of the preload plunger and permits the tilting movement of the preload plunger by absorbing this relative movement in the elastic surface features of the bushing tube.

In a preferred embodiment the third axial force transferring component is an axial load carrier ring being guided for linear movement with the nut and being in driving contact with and fixed in longitudinal direction to the nut so that the load carrier ring moves axially with the nut as one component. Two opposite rotation stop arms extend from the axial load carrier ring and are received in recesses of the preload plunger configured to prevent rotational movement of the axial load carrier ring relative to the preload plunger. The end faces of the axial load carrier ring and the bushing tube facing each other are configured such that they come into abutment against each other in two diametrically opposite contact points only, wherein the two diametrically opposite contact points define the second transverse axis which is perpendicular to first axis.

In a preferred embodiment the resilient surfaces features of the bushing tube comprise two bulges projecting from and extending circumferentially around the outer wall of the bushing tube and being spaced apart in axial direction of the bushing tube, wherein the bulges are made of elastic material and are dimensioned to be in contact with the inner wall of the central bore of the preload plunger when the bushing tube is received in the central bore of the preload plunger.

In preferred embodiments the screw and nut linear drive assembly is configured as a ball screw and nut assembly or as a lead screw and nut assembly.

BRIEF DESCRIPTION OF THE SEVERAL VIEWS OF THE DRAWINGS

In the following a preferred embodiment of the invention will be described with reference to the drawings in which:

FIG. 8 is a schematic plan view of the axial force transfer arrangement of FIG. 7 along a second transverse axis, which second axis is disposed perpendicular to the first axis.

DETAILED DESCRIPTION OF THE INVENTION

Figure 1:
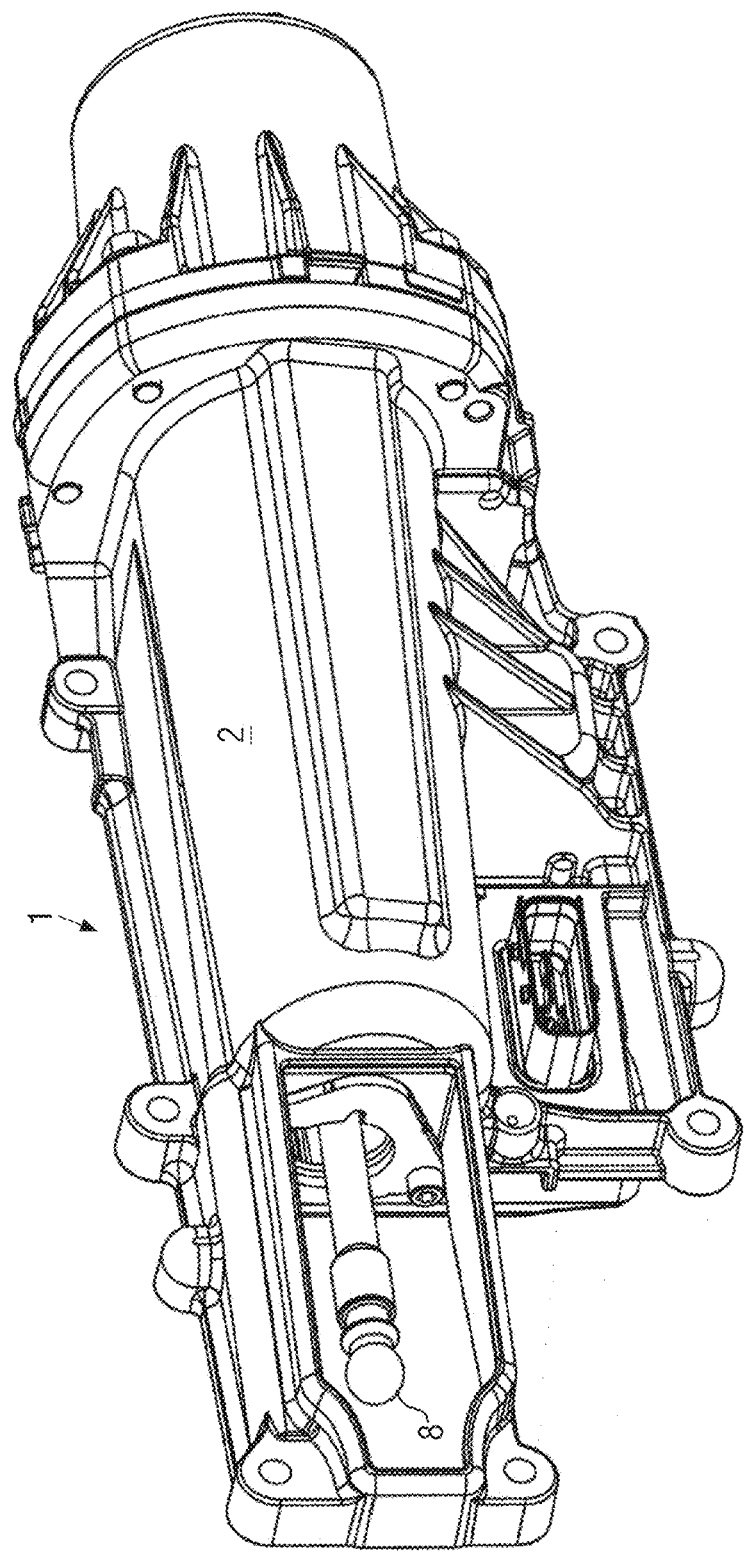
FIG. 1 shows a perspective view of a screw and nut linear drive assembly in the form of an electric clutch actuator.

FIG. 1 shows a perspective view of a linear screw and nut drive assembly, here embodied by an electric clutch actuator 1. The electric clutch actuator 1 comprises a housing 2 from which a moveable push rod 8 extends which is driven by the electric clutch actuator for linear movement. The push rod 8 is configured to be connected to a member to be actuated by the linear drive assembly, in this case to one end of a clutch lever (not shown) which is pivotably mounted to be pivoted by the push rod 8 between an engaged and a disengaged position.

The electric clutch actuator 1 includes an electric motor and a transmission (both not shown) within the housing 2. The electric motor drives, via the transmission, a screw (spindle) to rotate around the longitudinal direction defined by the central axis of rotation of screw. In this case the screw and the nut form a ball screw assembly. In such ball screw assembly the helical grooves of the screw are in indirect engagement with internal helical grooves of a nut via balls which roll within these grooves and which are returned by a ball return system after they reached an end of engagement end of the nut. The nut is axially moveable within the housing but held in a manner such that it is prevented from rotation about the central screw axis.

Alternatively there may be a direct driving engagement between the screw and the nut (lead screw and nut drive assembly). However, as mentioned before in the embodiment shown in the Figures, the present invention is embodied by a linear drive utilizing a ball screw assembly consisting of a screw and a nut, each with matching helical grooves, and balls which roll between these grooves and which provide the only contact between the nut and the screw. When screw and nut rotate with respect to each other, the balls are returned by a ball return system back into the ball screw and nut thread raceways formed by the helical grooves.

Figure 2:
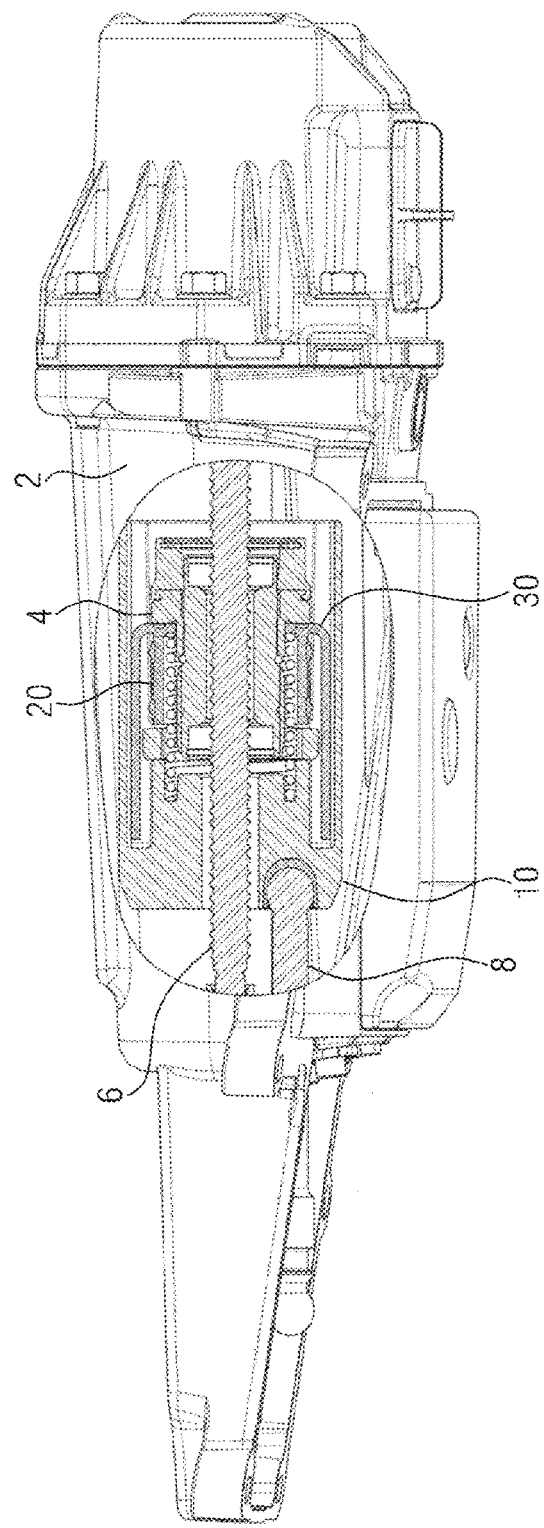
FIG. 2 shows a top view of the electric clutch actuator of FIG. 1, with a central portion of a housing cut out and internal components being shown in cross-section.
Figure 3:
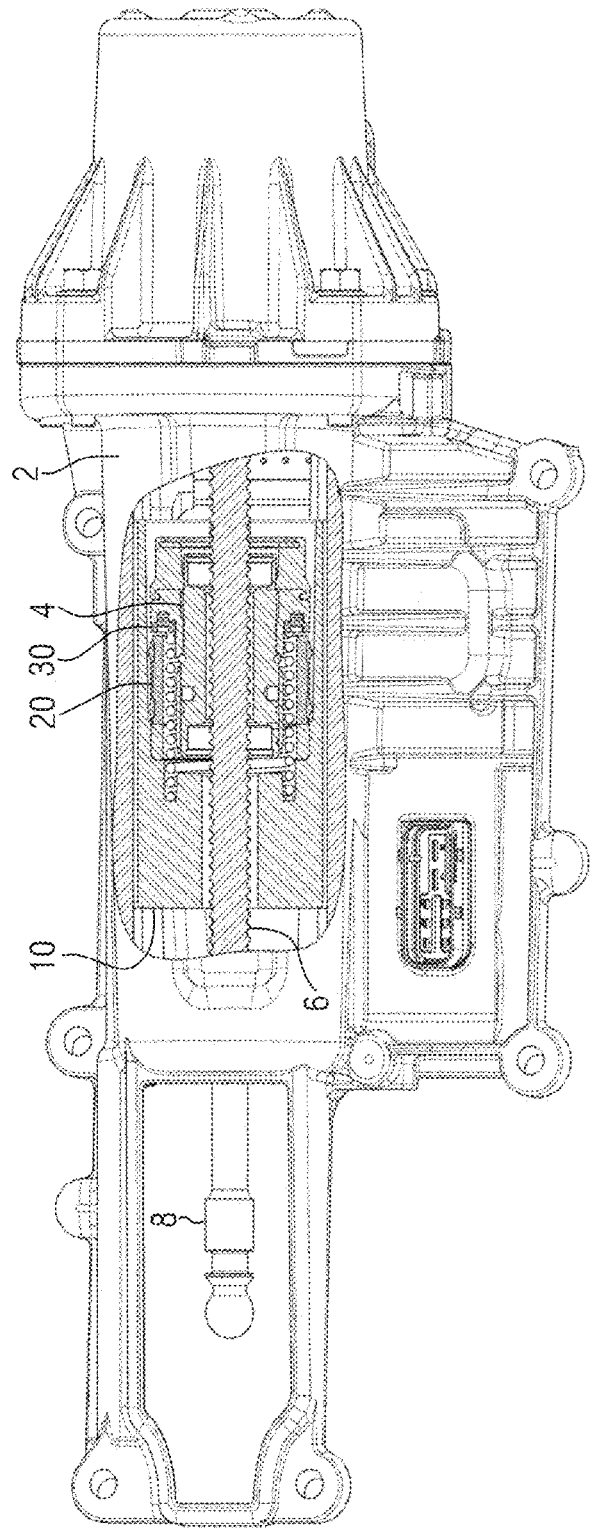
FIG. 3 shows a side view of the electric clutch actuator of FIG. 1, with a central portion of a housing cut out and internal components being shown in cross-section.

With reference to FIGS. 2 and 3 a first overview of the internal structure of the electric clutch actuator 1 will be given, wherein FIG. 2 shows a top view of the electric clutch actuator with a central portion of its housing cut out and the interior shown in cross-section, wherein FIG. 3 shows a similar view as a side view, i.e. the view axis is rotated by 90° around the longitudinal axis compared to FIG. 2. In FIG. 2 the push rod 8 is visible in the interior of the housing 2 in cross-section, and in a side view projecting from the housing. As can be seen in FIG. 2 the push rod 8 is transversely (in a plane perpendicular to the longitudinal axis (=rotational axis of the screw 6) offset with respect to the longitudinal axis of the screw 6. For this reason, if a force is transmitted to the push rod 8, as a reaction a torque is created which is acting between the push rod 8 and the nut 4 which is driven to provide the force for the push rod.

In FIG. 3 the push rod 8 is only visible with its projecting portion outside of the housing, whereas it is out of the plane of the cross-section in the cut out portion of the interior of the housing.

When the screw 6 is driven to rotate, the nut 4 linearly moves along the screw. The nut 4 is guided in the housing for linear movement along the longitudinal axis of the screw, but rotation around the longitudinal axis is prevented.

The axial force transfer arrangement transferring force from the nut 4 to the push rod 8 will now be described in more detail first with reference to FIGS. 2 and 3, and then in more detail with reference to the enlarged cross-sectional views of FIGS. 4 and 5, and the schematic views in FIGS. 7 and 8.

With reference to FIGS. 2 and 3 the axial force transfer arrangement comprises, in the direction from the push rod 8 to the nut 4 a first force transferring component 10, a second force transferring component 20, and a third force transferring component 30, the components of each pair of subsequent force transferring components being in force transferring contact with each other. In this manner the nut 4 is in force transferring contact with the push rod 8 through the axial force transfer arrangement comprising a train of force transferring components 10, 20, 30.

Figure 4:
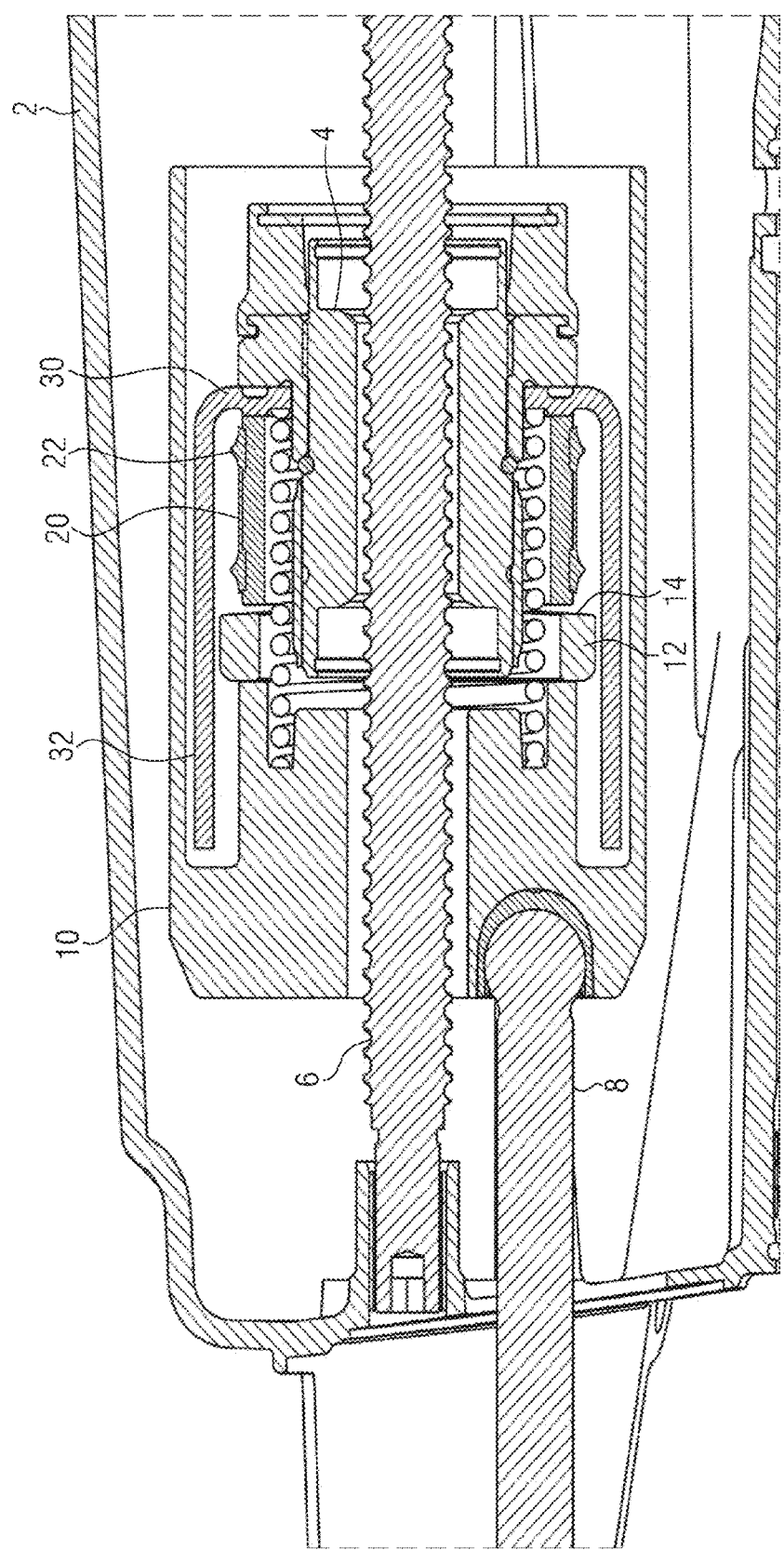
FIG. 4 is an enlarged partial view of the cross-section portion of FIG. 2.
Figure 5:
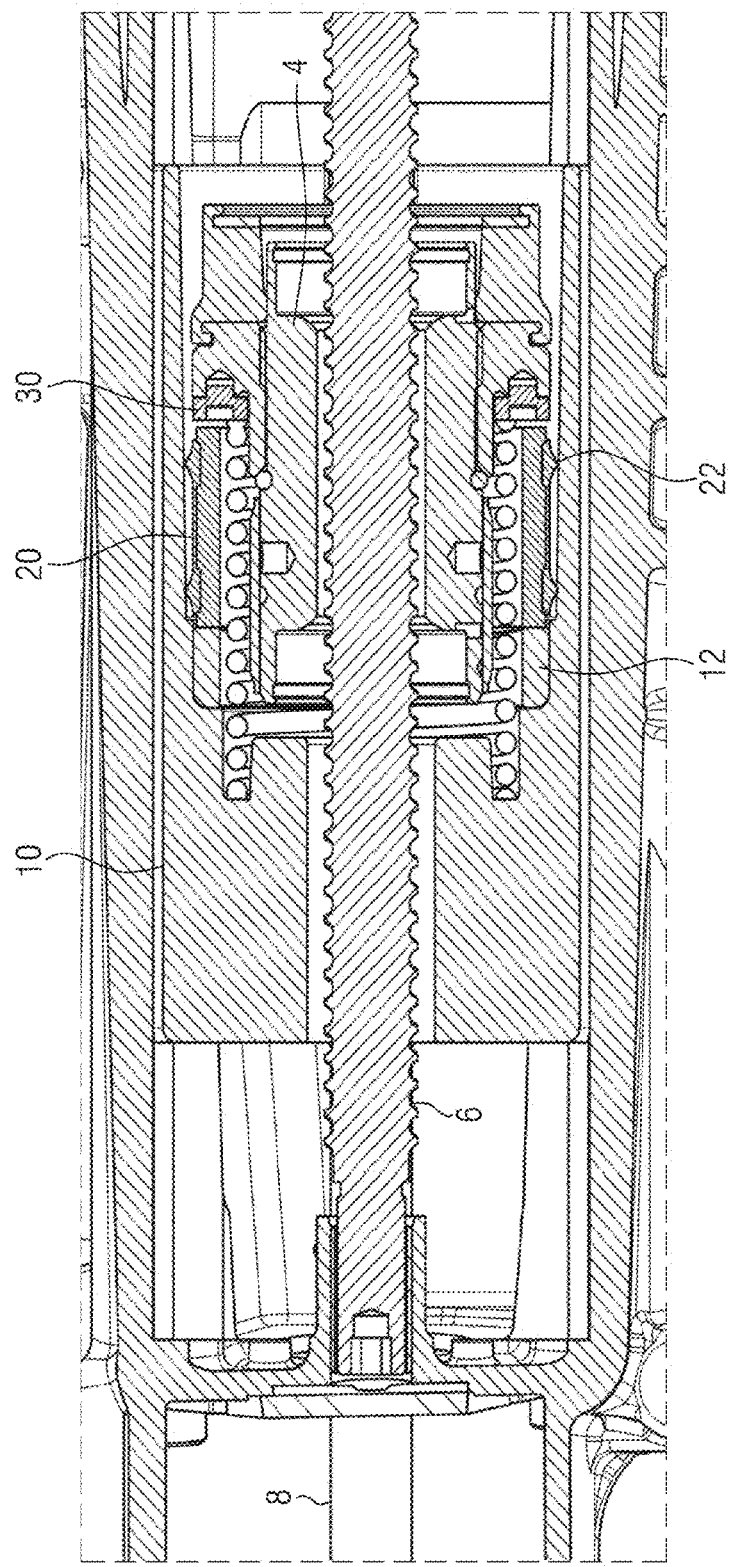
FIG. 5 is an enlarged partial view of the cross-section portion of FIG. 3.

With reference to FIGS. 4 and 5 the first force transferring component 10 is a preload plunger guided for linear movement within the housing 2. The preload plunger has in a front face thereof a recess in which the end portion of push rod 8 is received and connected thereto. The preload plunger has a central bore which partially extends into the preload plunger from a back face opposite to the front face into and partially through the preload plunger. The central bore is continued through the remaining portion of the preload plunger by a smaller diameter hole so that the screw 6 extends through the central bore and further through the central hole, and so extends completely through the preload plunger 10. The central bore of the preload plunger is provided with an abutment ring 12 resting on a shoulder end face of the central bore. A side surface of the abutment ring 12 provides an abutment surface 14 of the central bore which will be discussed in more detail below.

The second force transferring component 20 is a bushing tube received in the central bore. The outer wall of the bushing tube 20 is provided with resilient features 22, in the embodiment shown by two circumferentially extending ridges of elastic material.

As can be seen in the view of FIG. 5 the outer wall of the bushing tube 20 with its ridges 22 has contact with the inner wall of the central bore, whereas in the view of FIG. 4 the outer wall of the bushing tube has no contact with the inner wall of central bore of plunger. This 41 the preload configuration is such that the preload plunger 10 is in principle capable of being tilted about an axis perpendicular to the Figure plane of FIG. 4, without transferring such tilting movement to the second force transferring component 20 in the form of the bushing tube. This ability of relative tilting movement between the second force transferring components 10 and 20 is also a result of the configuration of the first and second force transferring components 10, 20 in such a manner that their contact surfaces define a first axis about which the first force transferring component 10 may pivot with respect to the second force transferring component 20. In the embodiment shown the first contact points between the first and second force transferring components 10, 20 are disposed diametrically opposite with respect to the longitudinal axis. Thus, there are two diametrically opposite contact points, as seen in the view of FIG. 5, where the first and second force transferring components 10 and 20 are in direct contact with each other, whereas in the remaining portion of the circumference between the diametrically opposite contact points there is a gap between the abutment surface 14 of abutment ring 12 of the preload plunger and the bushing tube, see FIG. 4.

Figure 7:
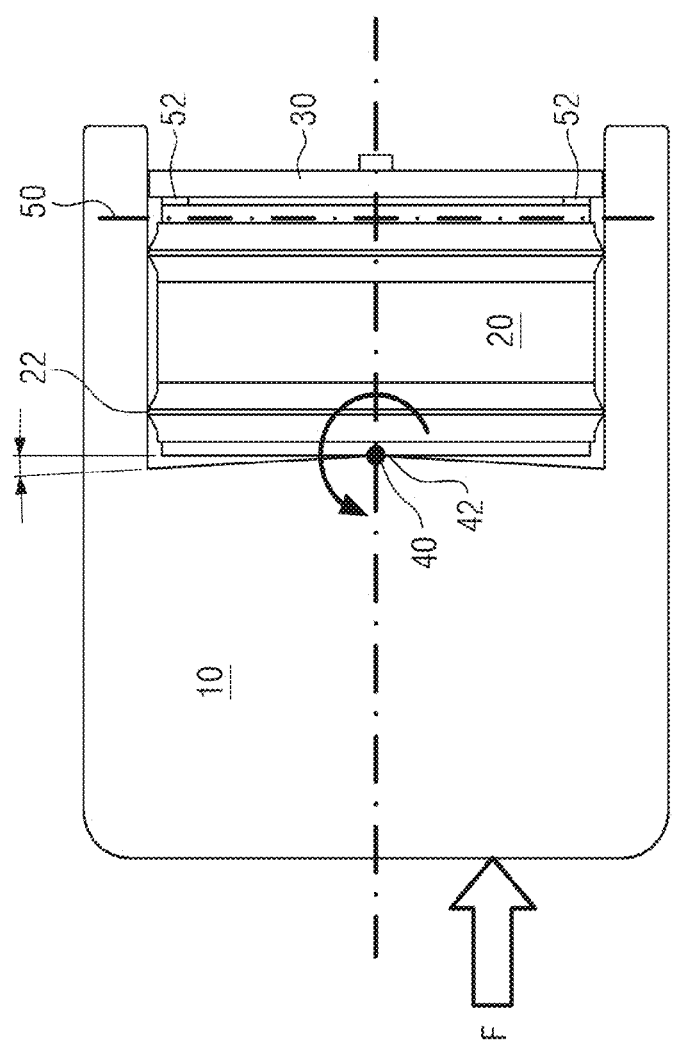
FIG. 7 is a schematic plan view of the axial force transfer arrangement along a first axis which is disposed in a transverse plane perpendicular to an axial direction.

This configuration of the first contact points between the first and second force transferring components 10, 20 is illustrated in a schematic way in FIGS. 7 and 8. As can be seen in FIG. 7 there is contact between the first and second force transferring components 10, 20 at first contact points 42 located in close proximity to the intersection point of the first axis 40 which is the viewing axis of FIG. 7. FIG. 8 shows a corresponding view with the view axis rotated by 90°. Now the first contact points 42 are visible as two diametrically opposite first contact points 42 between the first and second force transferring components 10, 20. With reference to FIG. 7 again, this configuration of first contact points 42 defining a first axis 40 (perpendicular to the Figure plane of FIG. 7) permits a certain pivotal movement of the first force transferring component 10 with respect to the second force transferring component 20. This tilting movement is indicated in FIG. 7 by the semi-circular arrow around the first axis 40.

Referring to FIGS. 4 and 5 again the description of the axial force transfer arrangement will now be continued. The second force transferring component 20 cooperates with a third force transferring component 30 which in the embodiment shown is a load carrier ring 30 which is disposed between the bushing tube 20 and an outwardly projecting portion of the nut 4. The load carrier ring 30 is further provided with two opposite, longitudinally extending rotation stop arms 32 which extend into recesses formed in the preload plunger 10 to prevent rotational movement of the load carrier ring 30 about the longitudinal axis; as a consequence, rotational movements are also prevented for the nut 4 which is coupled to the load carrier ring 30.

Figure 6:
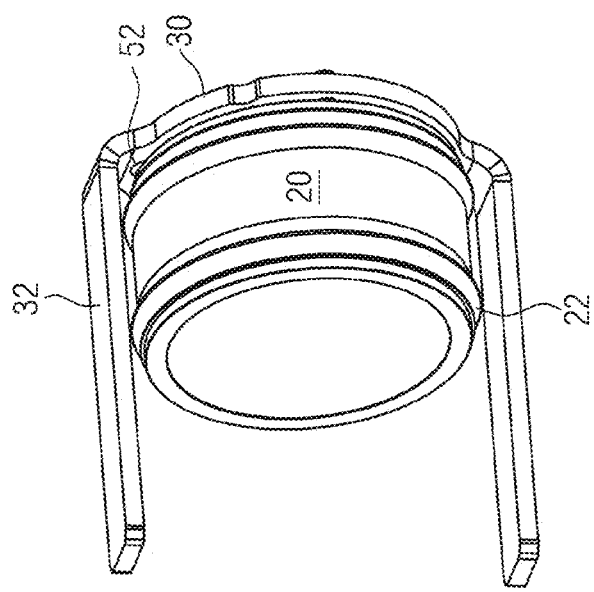
FIG. 6 is a perspective view of a part of the axial force transfer arrangement of FIGS. 2 to 5.

As can be seen in FIG. 4, the second force transferring component 20 is, in the plane of the cross-section of FIG. 4, in direct contact with the adjacent load carrier ring as the third force transferring component 30. Again two diametrically opposite second contact points between the second and third force transferring components 20, 30 are formed in the plane of the cross-section of FIG. 4, whereas the contact surfaces are configured that there is no direct contact between the first and second force transferring components 20, 30 in the remaining portion of the circumference. As can be seen in view of FIG. 5 in which the plane of the cross-section is rotated by 90° with respect to FIG. 4, in FIG. 5 there is a gap between the load carrier ring as the third force transferring component 30 and the bushing tube as the second force transferring component 20. This arrangement of the second contact points between the second and third force transferring components 20, 30 can be better understood with reference to the schematic views of FIGS. 6-8. As can be seen in the view of FIG. 7 there are two diametrically opposite contact points 52 formed by two small projections. These second contact points 52 are also visible in FIG. 6 which is a perspective view of the couple of load carrier ring 30 and bushing tube 20: In the circumferential area of the rotation stop arms 32 there are small projecting knobs on the inner side of the load carrier ring 30 which form the second contact points and which contact the end surface of the tube bushing 20.

Whereas in the view of FIG. 7 the two second, diametrically opposite contact points 52 are spaced apart, in the view rotated by 90° around the longitudinal direction as shown in FIG. 8 the two diametrically opposite second contact points 52 are now in line in the view axis of FIG. 8 (the view axis coinciding with the second axis 50) and are visible in the middle around the second axis 50 which is oriented perpendicular to the Figure plane of FIG. 8. This arrangement of two diametrically opposite contact points 52 between the second and third force transferring components 20, 30 defines this second axis 50 and allows a certain tilting movement between the first and second force transferring components 20 and 30 about the second axis 50.

As can also be seen in FIGS. 7 and 8 the first axis 40 and the second axis 50 are oriented perpendicularly to each other in a plane transverse to the longitudinal axis. In this manner the axial force transfer arrangement formed by the first, second, and third axial force transferring components 10, 20, 30 forms a double joint with two perpendicular joint axes, which cooperate to absorb any torque created by a force input to the push rod (counter force generated by the member being actuated via the push rod) which is offset with respect to the longitudinal screw axis or by any tolerances of the components of the axial force transferring components or bearings or guiding components.

The invention claimed is:

1. A screw and nut linear drive assembly comprising:
   a housing (2),
   a screw (6) within the housing,
   an electric motor for rotating the screw (6),
   a nut (4) which is driven, when the screw (6) is rotated, to move linearly in a longitudinal direction coinciding with a screw axis, and
   an axial force transfer arrangement to transfer force from the nut (4) to a push rod (8) to be connected to a member to be actuated by the screw and nut linear drive assembly,
   characterized in that the axial force transfer arrangement comprises a sequential arrangement of axial force transferring components which comprises, in a direction from the push rod (8) to the nut (4), a first axial force transferring component (10) guided for linear movement along the longitudinal direction and comprising a central bore with the central bore having an inner wall, and a second axial force transferring component (20) in force transmitting contact with the first axial force transferring component (10), and in that the first and second axial force transferring components (10, 20) are configured such that first contact points (42) between the first axial force transferring component (10) and the second axial force transferring component (20) define a first axis (40) in a plane perpendicular to the longitudinal direction, about which first axis (40) the second axial force transferring component (20) is capable of tilting with respect to the first axial force transferring component (10) in order to reduce transfer of any torque to the nut (4), and
   wherein the first axial force transferring component (10) defines an abutment surface (14) with the abutment surface (14) providing the first contact points (42),
   wherein the second axial force transferring component (20) engages the abutment surface (14) at the first contact points (42) to form a gap between the first and second axial force transferring components (10, 20) to facilitate the tilting of the second axial force transferring component (20) relative to the first axial force transferring component (10) about the first axis (40) in order to reduce the transfer of torque to the nut, and
   wherein the second axial force transferring component (20) is at least partially received in the central bore of the first axial force transferring component (10) and is dimensioned to be in contact with the inner wall of the central bore.

2. The screw and nut linear drive assembly according to claim 1, characterized in that the first axis (40) is oriented perpendicular to a transverse line connecting the screw axis with a point of the axial force transfer arrangement where the push rod (8) is coupled to the axial force transfer arrangement.

3. The screw and nut linear drive assembly according to claim 2, characterized in that the sequential arrangement of axial force transferring components comprises a third axial force transferring component (30) which is disposed between the nut (4) and the second force transmitting component (20) and which is in force transmitting contact with the second force transmitting component (20), and in that the second and third axial force transferring components (20, 30) are configured such that second contact points (52) between them define a second axis (50) in the plane perpendicular to the longitudinal direction about which second axis (50) the second axial force transferring component (20) is capable of tilting with respect to the third axial force transferring component (30), wherein the second axis (50) is oriented perpendicular to the first axis (40).

4. The screw and nut linear drive assembly according to claim 2, characterized in that
   the first contact points (42) comprise two diametrically opposite first contact points (42),
   the first axial force transferring component (10) is a preload plunger guided for linear movement in the housing along the longitudinal direction, the preload plunger having a recess disposed in a front face thereof and configured to receive and to be coupled to the push rod (8), wherein the preload plunger comprises the central bore forming an opening in a back face opposite to the front face and having, opposite to the opening, the abutment surface (14) formed by a circumferential shoulder in the central bore providing the two diametrically opposite first contact points (42), and the second axial force transferring component (20) is a bushing tube at least partially received in the central bore, the bushing tube and the abutment surface (14) of the preload plunger being configured to come into abutment with each other in the two diametrically opposite first contact points (42) only, an outer wall of the bushing tube being provided with resilient surface features (22) which permit tilting movements of the bushing tube with respect to the central bore of the preload plunger about the first axis (40) connecting the two diametrically opposite first contact points (42).

5. The screw and nut linear drive assembly according to claim 2, characterized in that the screw and nut linear drive assembly is configured as a ball screw and nut assembly or as a leadscrew and nut assembly.

6. The screw and nut linear drive assembly according to claim 1, characterized in that the sequential arrangement of axial force transferring components comprises a third axial force transferring component (30) which is disposed between the nut (4) and the second force transmitting component (20) and which is in force transmitting contact with the second force transmitting component (20), and in that the second and third axial force transferring components (20, 30) are configured such that second contact points (52) between them define a second axis (50) in the plane perpendicular to the longitudinal direction about which second axis (50) the second axial force transferring component (20) is capable of tilting with respect to the third axial force transferring component (30), wherein the second axis (50) is oriented perpendicular to the first axis (40).

7. The screw and nut linear drive assembly according to claim 6, characterized in that the second contact points (52) comprise two diametrically opposite second contact points (52), the third axial force transferring component (30) is an axial load carrier ring being guided for linear movement with the nut and being in driving contact coupled to the nut, wherein rotation stop arms (32) extend from the axial load carrier ring and are received in recesses of the first axial force transferring component configured to prevent rotational movement of the axial load carrier ring relative to the first axial force transferring component, wherein end faces of the axial load carrier ring and the second axial force transferring component facing each other are configured such that the end faces come into abutment against each other in the two diametrically opposite second contact points (52) only, the two diametrically opposite second contact points (52) defining the second axis (50) perpendicular to the first axis (40).

8. The screw and nut linear drive assembly according to claim 7, characterized in that resilient surface features (22) of the second axial force transferring component comprise two bulges projecting from and circumferentially extending around an outer wall of the second axial force transferring component and being spaced apart in an axial direction of the second axial force transferring component, wherein the bulges are made of elastic material and are dimensioned to be in contact with the inner wall of the central bore of the first axial force transferring component when the second axial force transferring component is received in the central bore of the first axial force transferring component.

9. The screw and nut linear drive assembly according to claim 7, characterized in that the screw and nut linear drive assembly is configured as a ball screw and nut assembly or as a leadscrew and nut assembly.

10. The screw and nut linear drive assembly according to claim 6, characterized in that resilient surface features (22) of the second axial force transferring component comprise two bulges projecting from and circumferentially extending around the outer wall the second axial force transferring component and being spaced apart in an axial direction of the second axial force transferring component, wherein the bulges are made of elastic material and are dimensioned to be in contact with the inner wall of the central bore of the first axial force transferring component when the second axial force transferring component is received in the central bore of the first axial force transferring component.

11. The screw and nut linear drive assembly according to claim 10, characterized in that the screw and nut linear drive assembly is configured as a ball screw and nut assembly or as a leadscrew and nut assembly.

12. The screw and nut linear drive assembly according to claim 6, characterized in that the first contact points (42) comprise two diametrically opposite first contact points (42), the first axial force transferring component (10) is a preload plunger guided for linear movement in the housing along the longitudinal direction, the preload plunger having a recess disposed in a front face thereof and configured to receive and to be coupled to the push rod (8), wherein the preload plunger comprises the central bore forming an opening in a back face opposite to the front face and having, opposite to the opening, the abutment surface (14) formed by a circumferential shoulder in the central bore providing the two diametrically opposite first contact points (42), and the second axial force transferring component (20) is a bushing tube at least partially received in the central bore, the bushing tube and the abutment surface (14) of the preload plunger being configured to come into abutment with each other in the two diametrically opposite first contact points (42) only, an outer wall of the bushing tube being provided with resilient surface features (22) which permit tilting movements of the bushing tube with respect to the central bore of the preload plunger about the first axis (40) connecting the two diametrically opposite first contact points (42).

13. The screw and nut linear drive assembly according to claim 6, characterized in that the screw and nut linear drive assembly is configured as a ball screw and nut assembly or as a leadscrew and nut assembly.

14. The screw and nut linear drive assembly according to claim 1, characterized in that the first contact points (42) comprise two diametrically opposite first contact points (42), the first axial force transferring component (10) is a preload plunger guided for linear movement in the housing along the longitudinal direction, the preload plunger having a recess disposed in a front face thereof and configured to receive and to be coupled to the push rod (8), wherein the preload plunger comprises the central bore forming an opening in a back face opposite to the front face and having, opposite to the opening, the abutment surface (14) formed by a circumferential shoulder in the central bore, and the second axial force transferring component (20) is a bushing tube at least partially received in the central bore, the bushing tube and the abutment surface (14) of the preload plunger being configured to come into abutment with each other in the two diametrically opposite first contact points (42) only, an outer wall of the bushing tube being provided with resilient surface features (22) which permit tilting movements of the bushing tube with respect to the central bore of the preload plunger about the first axis (40) connecting the two diametrically opposite first contact points (42).

15. The screw and nut linear drive assembly according to claim 14, characterized in that
   the second contact points (52) comprise two diametrically opposite second contact points (52),
   the third axial force transferring component (30) is an axial load carrier ring being guided for linear movement with the nut and being in driving contact coupled to the nut, wherein rotation stop arms (32) extend from the axial load carrier ring and are received in recesses of the preload plunger configured to prevent rotational movement of the axial load carrier ring relative to the preload plunger, wherein end faces of the axial load carrier ring and the bushing tube facing each other are configured such that they come into abutment against each other in the two diametrically opposite second contact points (52) only, the two diametrically opposite second contact points (52) defining the second axis (50) perpendicular to the first axis (40).

16. The screw and nut linear drive assembly according to claim 14, characterized in that the resilient surface features (22) of the bushing tube comprise two bulges projecting from and circumferentially extending around the outer wall of bushing tube and being spaced apart in an axial direction of the bushing tube, wherein the bulges are made of elastic material and are dimensioned to be in contact with the inner wall of the central bore of the preload plunger when the bushing tube is received in the central bore of the preload plunger.

17. The screw and nut linear drive assembly according to claim 14, characterized in that the screw and nut linear drive assembly is configured as a ball screw and nut assembly or as a leadscrew and nut assembly.

18. The screw and nut linear drive assembly according to claim 1, characterized in that the screw and nut linear drive assembly is configured as a ball screw and nut assembly or as a leadscrew and nut assembly.

* * * * *